(12) United States Patent
Huffman

(10) Patent No.: US 11,595,418 B2
(45) Date of Patent: Feb. 28, 2023

(54) GRAPHICAL CONNECTION VIEWER FOR DISCOVERY OF SUSPECT NETWORK TRAFFIC

(71) Applicant: T-Mobile USA, Inc., Bellevue, WA (US)

(72) Inventor: Joseph Kim Huffman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 294 days.

(21) Appl. No.: 16/947,148

(22) Filed: Jul. 21, 2020

(65) Prior Publication Data

US 2022/0030020 A1    Jan. 27, 2022

(51) Int. Cl.
*H04L 29/06* (2006.01)
*H04L 9/40* (2022.01)
*G06F 16/9038* (2019.01)

(52) U.S. Cl.
CPC ...... *H04L 63/1425* (2013.01); *G06F 16/9038* (2019.01)

(58) Field of Classification Search
CPC . H04L 63/1425; H04L 63/20; H04L 63/1441; G06F 16/9038; G06F 16/9024
See application file for complete search history.

(56) References Cited

U.S. PATENT DOCUMENTS

| | | | | |
|---|---|---|---|---|
| 2017/0289187 | A1* | 10/2017 | Noel | G06F 16/9024 |
| 2018/0063178 | A1* | 3/2018 | Jadhav | H04L 63/1433 |
| 2018/0069885 | A1* | 3/2018 | Patterson | G06F 21/554 |
| 2018/0343276 | A1* | 11/2018 | Lisle | H04L 63/1425 |
| 2019/0260804 | A1* | 8/2019 | Beck | H04L 51/212 |
| 2020/0244673 | A1* | 7/2020 | Stockdale | H04L 41/40 |
| 2021/0067558 | A1* | 3/2021 | Ni | G06N 3/084 |
| 2021/0297428 | A1* | 9/2021 | Hatekar | G06F 21/562 |

* cited by examiner

*Primary Examiner* — Joseph P Hirl
*Assistant Examiner* — Ka Shan Choy
(74) *Attorney, Agent, or Firm* — Lee & Hayes, P.C.

(57) ABSTRACT

A cyber security threat tool may detect, analyze and alert of cyber security threats in, for example, a communication network of a service provider. For example, the tool may receive network connection data associated with a plurality of network connections between a plurality of computing devices, generate, based at least in part on the network connection data, a graphical database comprising a plurality of graph nodes corresponding to the plurality of computing devices and a plurality of graph edges corresponding to the plurality of network connections and performing a database query on the graphical database to generate query results, the database query including a connection pattern to be matched by the query results generated by the performing the database query. The cyber security threat tool may then render at least a portion of the query results in a graph view and cause the graph view to be output to a user.

11 Claims, 5 Drawing Sheets

GRAPHICAL CONNECTION VIEWER FOR DISCOVERY OF SUSPECT NETWORK TRAFFIC

BACKGROUND

Modern communication networks of service providers often face cyber security threats. In many situations, however, operators of the service provider networks may be overwhelmed by the amount of network traffic that must be monitored and may not recognize a cyber security threat due to, for example, information overload or the presentation not being intuitive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
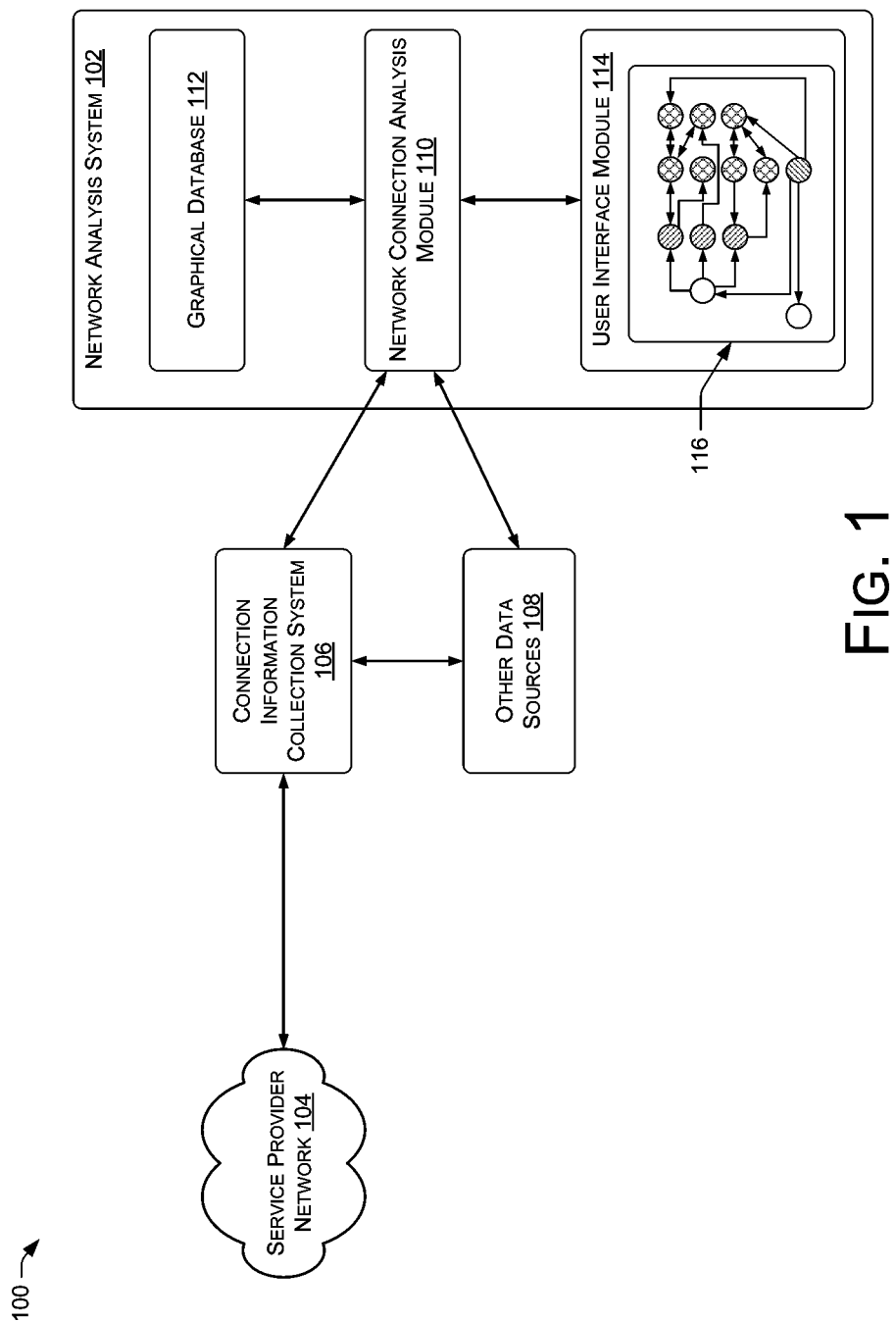
FIG. 1 is a block diagram illustrating an example telecommunication system which may provide a network analysis system that may detect, analyze, alert and/or respond to a cyber attack in, for example, a service provider network.

The described implementations provide devices, systems, and methods that provide a cyber security threat tool that may detect, analyze and/or alert of cyber security threats in, for example, the communication network of a service provider. As an example, in a service provider network, the cyber security threat tool may provide detection, analysis and/or alerting of a new ransomware attack that is targeting vulnerable servers due to their patching status and/or outdated operating system.

The cyber security threat tool disclosed herein may utilize a graphical database. In the graphical database, network connection logs may be transformed into nodes and relationships (e.g., edges between nodes in the graphical database). The nodes may represent network devices that may be internal or external to the service provider network. The relationships may represent connections between the devices.

In some examples, nodes and relationships may be enriched with additional information from sources outside the network connection logs. In some examples, the addition information may be added as labels and properties. Such additional information may include information about threats that have affected other computing devices in recent times (e.g., historical context of where these threats originated, who is behind them, when have they attacked, what methods they used, and what they're after, Active Directory or other directory service information about users or computing devices, Internet Assigned Numbers Authority (IANA) data regarding port names and descriptions, work flows, vulnerabilities, information regarding fraud, geolocation data for computing devices and so on.

The cyber security threat tool disclosed in this application may utilize a graphical query interface to query the graphical database and results for queries may be presented in an interactive graphical visualization (e.g., a vector graph form). The graphical query interface may accept queries for pattern matching on the graph based on, for example, connections to friendly and hostile devices based on host names, IP addresses, geolocations, risk scores, selected port numbers, connection statuses, protocols, and timestamps. For example, a pattern that models one type of attack in progress may be that (1) a threat actor (e.g., computing device external to the service provider network) connects with an internal device from a high risk IP address and then (2) the internal device connects with an external device (e.g., the same or a different external device as the threat actor) at a high-risk IP address a short time later.

In another example, the cyber security threat tool may detect and alert for connections to a high risk external device followed by a connection to an internal device within a short period of time. In some examples, the cyber security threat tool may consider this pattern as indicative of the transfer of data, such as malware, from an external device to an internal device which does not have direct access to the Internet using a compromised internal device as an intermediary.

In another example, the cyber security threat tool may detect and alert for external device initiating connections on multiple ports and failing to connect to an internal device. In some examples, the cyber security threat tool may consider this pattern as indicative of port scanning. In a variation of this pattern, if the external device is initiating connections to multiple internal devices using multiple ports and mostly failing to connect, the external device may be port scanning with the service provider network as the specific target.

The cyber security threat tool and associated techniques described herein can improve the functioning of a computing devices and computing networks by providing a robust mechanism for detecting and alerting network service provider operators of cyber security threats. The very interoperability and sophisticated integration of technology that make networks such valuable assets also make them vulnerable to attack, and make dependence on networks a potential liability. Typically, detecting suspect network activity is based on searching for Indicators of Compromise (IOCs) such as IP addresses, filenames, and email addresses known to be associated with malicious activity. In typical tools, such IOCs may be found and presented in a tabular form such as a spreadsheet. However, patterns of suspect behavior are not easily discovered and complex patterns are difficult to find using such tools.

In some instances, the techniques used herein may implement a cyber security threat tool including a graphical query interface to query the graphical database. As discussed above, the graphical query interface may accept queries for pattern matching on the graph based on, for example, connections to friendly and hostile devices (e.g., devices internal to the service provider network and devices external to the service provider network known to be high risk or from high risk domains). This pattern matching may be based on host names, IP addresses, geolocations, risk scores, on selected port numbers, connection statuses, protocols, timestamps and so on. The results for queries may be presented in an interactive graphical visualization (e.g., a vector graph form). Using the graphical query interface with the graphical database, complex patterns of suspect behavior may be readily detected, thus improving the functioning of computing devices and computing networks.

In some instances, the cyber security threat tool discussed herein may also perform queries and alerts more accurately and completely that prior systems, may require less processing power, and/or may require less memory than conventional cyber security threat tools. These and other improvements to the functioning of the computer are discussed herein.

FIG. 1 illustrates an example telecommunication system 100, which may provide a network analysis system 102 that may detect, analyze, alert and/or respond to a cyber attack in, for example, a service provider network 104. The system 100 may include the network analysis system 102 of a service provider, the service provider network 104, a connection information collection system 106 and other sources 108 of data. The network analysis system 102 may include a network connection analysis module 110, a graphical database 112 and a user interface module 114.

The network connection analysis module 110, graphical database 112 and user interface module 114 of the network analysis system 102 may operate in conjunction to perform the functions of the cyber security threat tool discussed above with respect to the service provider network 104.

The service provider network 104 may be a network associated with a service provider of network services. The service provider may provide communication services over wired networks and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology. These are merely examples and the service provider network described herein, may be capable of providing communications via one or more of a 3G, 4G, 4G LTE, and/or 5G protocols. Further, implementations are not limited to user equipment of service provider networks or service provider networks. For example, implementations may protect corporate networks such as the network used by employees of a service provider or other entity (e.g., finance, customer service, engineering, etc.) or the network infrastructure which may manage customer networks of a service provider (e.g., computers which may control and/or observe cell towers, data centers, etc.).

In operation, the network analysis system 102 may provide the functionality of the cyber security threat tool discussed above. The network connection analysis module 110 may receive connection data from the connection information collection system 106 and other data sources 108. The connection information collection system 106 may monitor or probe the service provider network 104 to collect or generate connection data about the service provider network 104. The connection information collection system 106 may provide the connection data to the network connection analysis module 110.

The network connection analysis module 110 may analyze or process the connection data received from the connection information collection system 106 regarding connections to determine details regarding the connections depending upon the type of connection.

Some examples may have the two connection types: internal connections between internal devices of the service provider network and "threat worthy connections" between an internal device and an external device. Depending on the implementation, threat worthy connections may be further qualified. For example, a "threat worthy connection" may be a connection (or attempted connection) involving external device(s) from a hostname, IP or domain which is considered "high-risk". Risk data about high-risk hostnames, IP addresses or domains may be obtained from the other data sources 108, the network analysis system 102 may determine the risk data directly or some combination thereof. For example, the network analysis system 102 may determine an external device to be high risk based on prior observation of malicious actions by the external device. A risk score of the external device may be a binary or trinary (high risk, low risk and/or no risk), determined on a continuous scale or so on. For example, an external device observed as participating in multiple malicious actions may have a higher risk score than an external device observed as part of a single malicious action.

In some examples, risk data may be utilized to determine a priority indicator that may be output to a user. For example, a priority score may be determined based on two components: a sensitivity of the targeted asset (e.g., internal device) and the risk score of the attacker. The sensitivity of the targeted asset may be assigned by the owners of the asset and/or a security team. For example, a financial computer system such as payroll or billing may have a higher sensitivity score than an individual workstation. Similarly, a work station of a CEO may have a higher sensitivity score than a workstation of a summer intern. The risk and sensitivity scores may be weighted and the weighted scores may be squared. The squares may then be added and a priority score may be computed as the square root of the sum.

The other data sources 108 may provide additional data to the network analysis system 102 and/or the connection information collection system 106 such as Active Directory or other directory service information about users or computing devices, Internet Assigned Numbers Authority (IRNA) data regarding port names and descriptions, geolocation data for computing devices and so on. The additional data may be used by the network analysis system 102 and/or the connection information collection system 106 to enrich or provide details for the connections of the connection data.

The enriched connection data may then be input to the graphical database 112. The graphical database 112 may generate nodes that represent and correspond to the computing devices involved in connections of the connection data. The graphical database 112 may also generate edges that represent and correspond to connections between the computing devices. In some examples, some edges may represent actions (e.g., log in, a data transfer, commands, etc.). The additional or enriched details may be added to the nodes and edges as properties and labels. Properties may refer to something associated with the node or edge (e.g., a set property of the node or connection). Example properties may include the host name of a computing device, the username of a user, and the port used in a connection attempt and so on. Example labels may refer to additional information derived or determined about the node or edge (e.g., a risk associated with a node and/or a user associated with a node determined based on the user's username) In another example, labels may describe what the node is. In such a case, the properties may describe details. For example, a user equipment node may have a label of "user" with the properties of "username", "display name", "phone", "location", and "title". In a further example, nodes might have labels "Owned" and "External" to indicate what the devices are (e.g., a device owned by the service provider, a device external to the service provider network, etc). Both the owned device and the external device may have properties of "IP address", "hostname", and "risk score". It should also be noted that internal devices may also have risk scores. For example, a compromised internal device being used to propagate malware may be given a risk score in a similar manner to a malicious external device.

The user interface module 114 may be utilized by a user of the network analysis system 102 to submit queries to the graphical database 112 via the network connection analysis module 110. The user interface module 114 may also be utilized to control the network connection analysis module 110 to selectively filter the connection data that is output to the graphical database 112. For example, a user may request that the connection data output to the graphical database 112 be filtered to connections involving high risk IP addresses, hostnames, or domains. In addition, the filtering may include connections between the internal devices involved in high risk connections and other internal devices. Further, the filtering may include one or more time windows for which connections will be included. For example, the filtering may include connections between the internal devices involved in high risk connections and other internal devices that occurred within a time window after the communication of the internal device with the high risk device. Additional or alternative filtering criteria may also be utilized.

Queries to the graphical database 112 may select a subset of nodes and connection types and can also select for patterns of activity. Examples of patterns of activity may include Tactics, Techniques and Procedures (TTPs). Detecting certain patterns of activity may reduce false positives compared to signature/rule-based alerting and may find suspicious activity earlier in the kill chain.

In some examples, the patterns of behavior may have a time component. In addition, the order of events may be considered as well as the time elapsing between events in the pattern. Some examples may utilize graphical databases 112 that may have functionality for dealing with time and duration. For example, one or more of the connection types considered, processed or analyzed by the network analysis system 102 may have a time component. A connection between an internal device and an external device may have one or more time properties such as a timestamp property that may indicate the last time the IP address of the external device was seen in communications with the internal device. A connection between two internal devices may have one or more properties that indicate time information about of the connection, such as the start time of the connection, the last time the connection was observed and/or a duration of the connection. Using the user interface 114, a user may create a pattern query that filters based on instants in time and/or on time durations of the connections.

Pattern queries may be based on a model pattern modeling a connection pattern of, for example, a type of threat.

In an example, one type of threat, an attack in progress, may have a model pattern including a threat actor (e.g., an external device associated with a high risk IP address, hostname or domain) connecting with an internal device followed by the internal device connecting with another high-risk device, IP address, hostname or domain IP within a threshold period of time (e.g., a short time later).

Another type of threat, a transfer from a malicious device to an internal device via an intermediary internal device, may have a model pattern that includes the establishment of a connections between an external device and an internal device, followed by the establishment of another connection, by the internal device, to another internal device within a threshold period of time (e.g., a short time later). In some examples, this model pattern of connections may be indicative of the transfer of data (e.g., malware) from an external device to an internal device which does not have direct access to the Internet. The intermediate internal device has access to both.

A further type of threat, a port scanning attempt, may have a model pattern that includes an external device initiating a plurality of connections with an internal device on multiple ports and failing to connect. A variation of this model pattern may include the external device initiating connections to multiple internal devices of the service provider network and mostly failing to connect with the internal devices (e.g., with or without attempting multiple ports for each internal device). This may be indicative of a port scanning attempt with the service provider network as the specific target (e.g., particularly where multiple ports are attempted for each of the one or more individual internal devices).

It should be noted that connections that match the model pattern may be unrelated as the connection timing may be coincidental. As such, the connections between nodes that match a model pattern may be rendered into a graphical view and output to a user via the user interface module 114 for further investigation. An example 116 of such a graphical view is illustrated. For example, the graphical view output via the user interface module 114 may illustrate the nodes, the edges, properties and/or labels of the graphical database 112 associated with the connections matching the query (properties and labels are not shown in example 116 for ease of illustration). In cases in which no connections match the query, the user interface may be configured to output a notification to that effect to the user.

The user interface module 114 may provide functionality to allow the user to interact with the graphical view and to determine if there is anything of significance going on. For example, the user interface module 114 may be customizable to allow the user to vary the information, the amount of information displayed as well as the level of detail displayed as the user investigates further. In addition, the user interface module 114 may allow for the user to select labels or properties of the nodes and edges shown in the graphical view to display additional information about the selected labels and properties.

While examples discussed herein refer to displaying results in a user interface, implementations are not so limited. In some implementations, the user interface and/or results of queries may be output to a printer, plotter, or other output device. In some examples, in addition or alternative to outputting the graphical view, query results may be output in tabular form (e.g., a spreadsheet of suspicious connections), as a list (e.g., a list of suggested actions for an analyst to take), a narrative report (e.g., a narrative report for distribution to asset owners, a narrative report for a manager or a management body), as a communication with other system(s) (e.g., an instruction to another system to take actions such as isolating comprised computers from the network), and so on.

In summary, network connection analysis module 110 may combine connection data from the connection information collection system 106 and other data sources 108 to generate enriched connection data for the service provider network 104. The enriched connection data may be input to the graphical database 112 to generate graph nodes and edges representing the devices and connections, respectively, with properties and labels storing the enriched information. The user interface module 114 may provide an interface to the network connection analysis module 110 and/or graphical database 112 to allow a user to control the connection data collection and combination, as well as to allow the user to submit queries to the graphical database 112.

The graphical database may include functionality to process queries based on connection patterns which may allow even complex behaviors to be modeled and queried. The results of queries may be output to the user via the user interface in a graphical view which may provide for varying levels of detail based on further user input. The graphical view may allow the user to recognize tactics used by threat actors from among huge collections of connection data.

The network analysis system 102, connection information collection system 106 and the other data sources 108 may each comprise one or more computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. The network analysis system 102, connection information collection system 106 and the other data sources 108 may also each comprise a non-mobile computing device. Examples of non-mobile UEs may include such things as televisions, desktop computers, a game consoles, set top boxes, home automation components, security system components, and so forth. In this sense, the terms "communication device," "wireless device," "wireline device," "mobile device," "computing device," and "user equipment (UE)" may be used interchangeably herein to describe any communication device capable of performing the techniques described herein.

Figure 2:
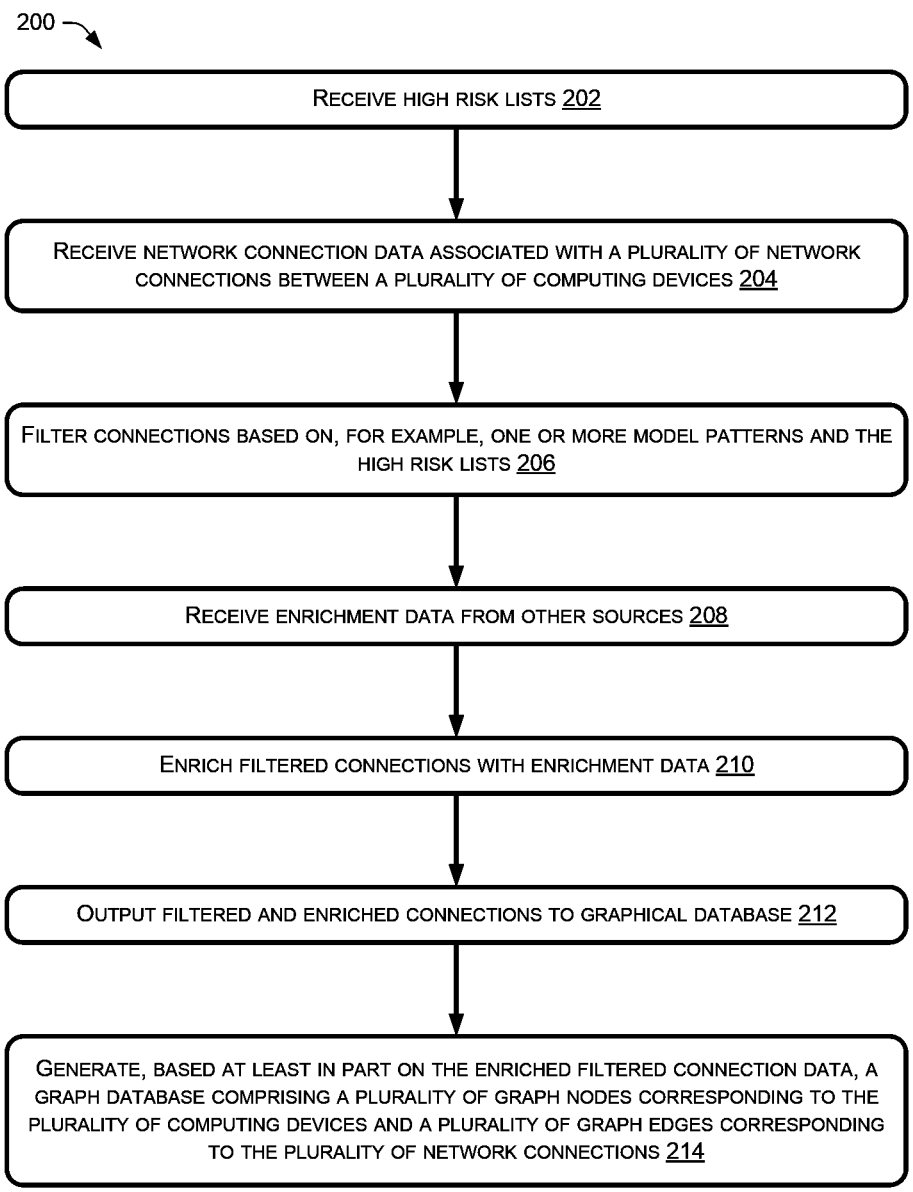
FIG. 2 is a flow diagram illustrating an example method of generating a graphical database based on connection data for, for example, the service provider network in the example system of FIG. 1.

FIG. 2 illustrates an example method 200 of generating a graphical database based on connection data for, for example, the service provider network 104 in the example system of FIG. 1, according to some implementations. The operations of example method 200 may be performed by the network analysis system 102 of FIG. 1 in some examples.

At 202, the network analysis system 102 may receive high risk lists of, for example, high risk IP addresses, domains and/or host names. The high risk lists may be received from an external source (e.g., a cyber security provider) or may be developed, maintained internally by the service provider of the service provider network 104 or some combination thereof.

At 204, the network analysis system 102 may receive network connection data associated with a plurality of network connections between a plurality of computing devices (e.g., including computing devices internal and external to the service provider network 104). The received connection data may be specific to particular communication packets exchanged between the computing devices or pre-processed to provide information regarding the connection over a period or at a point in time, rather than each packet flow. For example, the connection information collection system 106 of FIG. 1 may perform such pre-processing in some examples.

At 206, the network analysis system 102 may filter the connections based on, for example, one or more model patterns and/or the high risk lists. For example, the network analysis system 102 may filter connections to those involving high risk IP addresses, hostnames, or domains, connections between the internal devices involved in high risk connections and other internal devices, and/or connection occurring within one or more time windows. For example, the filtering may include high risk connections involving high risk IP addresses, hostnames, or domains and connections between the internal devices involved in high risk connections and other internal devices that occurred within a time window after the communication of the internal device with the high risk device.

At 208, the network analysis system 102 may receive enrichment data from the other sources. Then, at 210, the network analysis system 102 may enrich the data regarding the filtered connections with the enrichment data. For example, the enrichment data may include Active Directory or other directory service information about users or computing devices, Internet Assigned Numbers Authority (IRNA) data regarding port names and descriptions, geolocation data for computing devices and so on. The additional data may be used by the network analysis system 102 to enrich or provide details for the connections of the filtered connection data.

At 212, the enriched filtered connection data may be output to the graphical database. At 214, the graphical database 112 of the network analysis system 102 may generate, based at least in part on the enriched filtered connection data, a graphical database comprising a plurality of graph nodes corresponding to the plurality of computing devices and a plurality of graph edges corresponding to the plurality of network connections. More particularly, the graphical database 112 may generate nodes that represent and correspond to the computing devices involved in connections of the connection data. The graphical database 112 may also generate edges that represent and correspond to connections between the computing devices. In some examples, some edges may represent actions (e.g., log in, a data transfer, commands, etc.). The additional or enriched details may be added to the nodes and edges as properties and labels. Properties may refer to something associated with the node or edge (e.g., a set property of the node or connection). Example properties may include the host name of a computing device, the username of a user, and the port used in a connection attempt and so on. Example labels may refer to additional information derived or determined about the note or edge (e.g., a risk associated with a node and/or a user associated with a node determined based on the user's username).

Variations on the process illustrated in FIG. 2 are within the scope of this disclosure. For example, in some implementations, unfiltered connection data may be input into the graphical database. The enrichment of the connection data may be then performed on the nodes and edges of the graphical database representing the connections and devices. The filtering may then be performed at the time the query is received, during analysis, or in an automated process following the enrichment.

In another example variation, a graphical database of all high risk IPs and domains may be maintained. Network connection data may then be used to add other nodes and connections between nodes.

Figure 3:
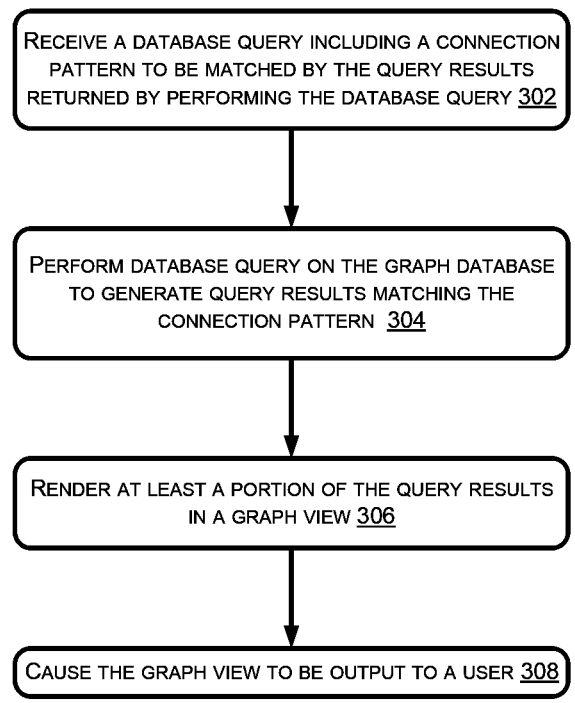
FIG. 3 is a flow diagram illustrating an example method of processing a query to the graphical database in the example system of FIG. 1.

FIG. 3 illustrates an example method 300 of processing a query to the graphical database, according to some implementations.

At 302, the network analysis system 102 may receive a database query including a connection pattern to be matched by the query results returned by performing the database query. For example, a user may input the database query to the user interface module 114. Queries to the graphical database 112 may select a subset of nodes and connection types and can also select for patterns of activity. Example database queries according to some examples herein are discussed above with respect to FIG. 1.

At 304, the network analysis system 102 may perform the database query on the graphical database to generate query results matching the connection pattern. The network analysis system 102 may then render at least a portion of the query results in a graph view at 306. The graph view may then be output to a user at 308 to allow the user to determine if there is anything of significance going on. Though not shown, in some examples, the method may further include receiving and implementing user inputs to control the graphical view output. For example, the user interface module 114 may be customizable to allow the user to vary the information and the amount of information displayed as well as the level of detail displayed as the user investigates further. In addition, the user interface module 114 may allow for the user to select labels or properties of the nodes and edges shown in the graphical view to display additional information about the selected labels and properties.

Figure 4:
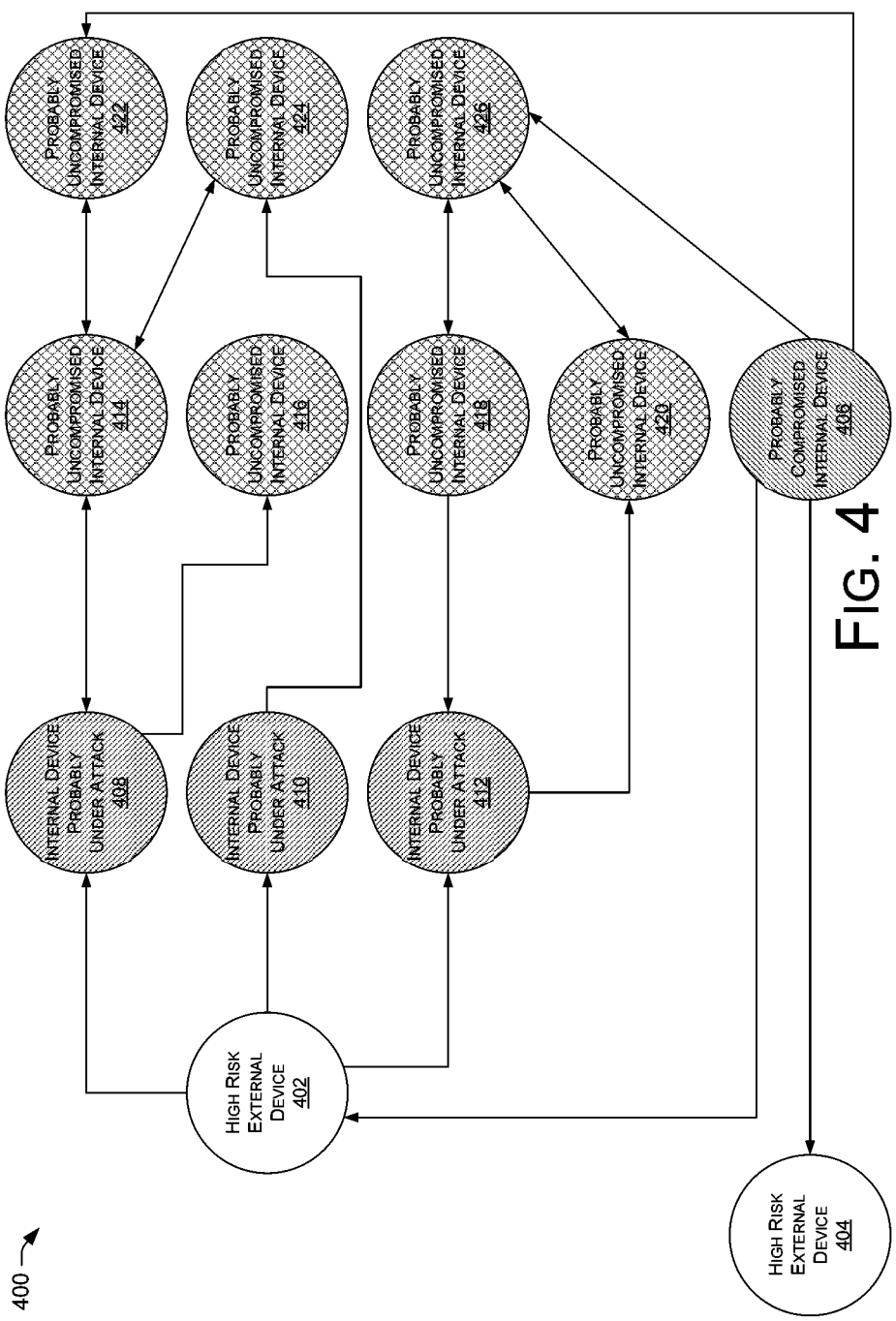
FIG. 4 illustrates an example graphical view of a graphical database of a cyber security threat tool, according to some implementations.

FIG. 4 illustrates an example graphical view 400 of a graphical database of a cyber security threat tool, according to some implementations. More particularly, the graphical database may include high risk connections involving high risk IP addresses, hostnames, or domains and include connections between the internal devices involved in high risk connections and other internal devices that occurred within a time window after the communication of the internal device with the high risk device.

The graphical database may further include properties and labels for the connections. For example, the graphical database may include properties such as the port number used in the connections and labels such as the status of the devices corresponding to the nodes. For example, in the illustrated example, each node is labeled with the node's status as one of a high risk external device (e.g., devices 402-404), a probably compromised internal device (e.g., device 406), an internal device probably under attack (e.g., devices 408-412) or a probably uncompromised internal device (e.g., 414-426). Other properties and labels have not been shown to avoid clutter and confusion from port numbers in the drawings.

As stated above, each node and connection is included based on the node or connection matching a filter. More particularly, devices 402 and 404 may have been included as high risk devices due to associations with a high risk IP address, hostname, domain or the like. Device 406 may have been included as it is involved in a connection with an outside device, as well as because device 406 connected to devices 402, 426 and 422 within the time window after communicating with device 404. Devices 408-412 may be included in the graphical database for being involved in communications with the high risk devices. Devices 414-426 may be included for communicating with an internal device involved in high risk connections within a time window after the communication of the internal device with the high risk device.

Additionally, because the connection between the device 406 and device 402 may occur within the time window after the connection with device 404, the device 406 may match the attack in progress pattern and may be labeled as "probably compromised."

A user may query the graphical database using a graphical query language to determine groups of connections that match one or more model patterns. Additional views may be provided related to the model patterns. For example, if a user inputs a query based on the attack in progress model pattern, the network analysis system 102 may output a graphical view including nodes 402-406 and the connection therebetween as these nodes and connections match the queried model pattern. These and other example queries may be performed as discussed above with regard to FIG. 1.

In addition, the network analysis system 102 may perform operations to handle the cyber security threats. For example, the network analysis system 102 or a user may evaluate the supplied data and report a compromised device or other cyber security threat. In some examples, the owners of the devices probably under attack may be notified and asked to verify all patching is up to date and, if practical, the high risk IPs, hostnames and/or domains may be blocked (e.g., with the help of DNS and firewall operators). In addition, reports of the cyber security threats may inform operators of the service provider network of the health of the system, attack trends, and/or active threat actors.

Figure 5:
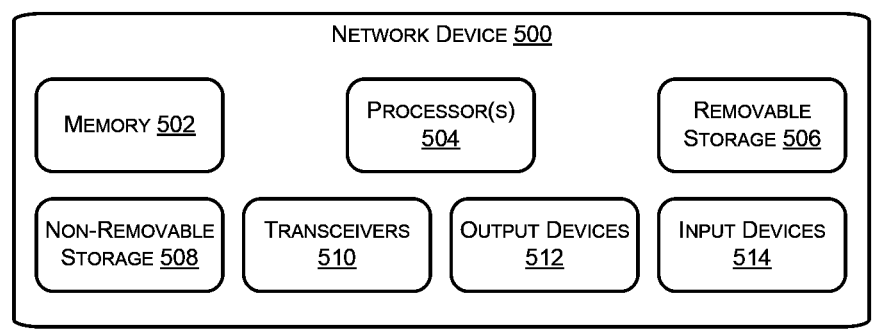
FIG. 5 is a block diagram illustrating relevant high-level components of a device that may be used to implement various components described herein.

FIG. 5 illustrates a component level view of a telecommunication network device 500 capable of implementing the network analysis system 102 and other network devices of FIG. 1. The network device 500 may, as an example, comprise a physical or virtual computer server. The network device 500 may comprise a system memory 502 storing various executable components and data for implementing the systems and methods 100-400 of FIGS. 1-4. The network device 500 may further comprise processor(s) 504, a removable storage 506, a non-removable storage 508, transceivers 510, output device(s) 512, and input device(s) 514, any or all of which can be communicatively connected via a communications bus (not shown).

In various examples, the system memory 502 is volatile (such as RAM), non-volatile (such as ROM, flash memory, etc.) or some combination of the two. In some examples, the processor(s) 504 is a central processing unit (CPU), a graphics processing unit (GPU), or both CPU and GPU, or any other sort of processing unit.

The network device 500 also includes additional data storage devices (removable and/or non-removable) such as, for example, magnetic disks, optical disks, or tape. Such additional storage is illustrated in FIG. 5 by removable storage 506 and non-removable storage 508. The system memory 502, removable storage 506 and non-removable storage 508 are all examples of non-transitory computer-readable storage media.

In some examples, the transceivers 510 include any sort of transceivers known in the art. For example, transceivers 510 may include a radio transceiver that performs the function of transmitting and receiving radio frequency communications. Also, or instead, the transceivers 510 may include other wireless or wired connectors, such as Ethernet connectors or near-field antennas. The transceivers 510 may facilitate connectivity between a public network, such as a packet-switched access network (not shown), and one or more other devices of a telecommunication network.

In some examples, the output devices 512 include any sort of output devices known in the art, such as a display, speakers, a vibrating mechanism, or a tactile feedback mechanism. Output devices 512 also include ports for one or more peripheral devices, such as headphones, peripheral speakers, or a peripheral display.

In various examples, the input devices 514 include any sort of input devices known in the art. For example, the input devices 514 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A computer-implemented method comprising:
   receiving network connection data associated with a plurality of network connections between a plurality of computing devices;
   generating, based at least in part on the network connection data, a graphical database comprising a plurality of graph nodes corresponding to the plurality of computing devices and a plurality of graph edges corresponding to the plurality of network connections;
   performing a database query on the graphical database to generate query results, the database query including a connection pattern to be matched by the query results generated by the performing the database query, wherein the connection pattern comprises connection activity over a period of time and the connection activity over a period of time includes:
      a first connection, initiated by a first computing device with a first Internet Protocol (IP) address associated with a high risk level, with a second computing device, and
      a second connection, initiated by the second computing device subsequent to the first connection and within the period of time, with a third computing device with a second IP address associated with the high risk level;
   rendering at least a portion of the query results in a graph view; and
   causing the graph view to be output on a to a user.

2. The computer-implemented method of claim 1, wherein the plurality of graph nodes are labeled as one or more of:
   associated with the user;
   having a low-risk level; or
   having a high risk level.

3. The computer-implemented method of claim 1, further comprising:
   performing a second database query on the graphical database to generate second query results, the second database query including a second connection pattern to be matched by the second query results generated by the performing the second database query;
   determining that the second database query returned zero second query results matching the second connection pattern; and
   causing a notification that the second database query returned zero second query results matching the second connection pattern to be output to a user.

4. A system comprising:
   one or more processors; and
   one or more non-transitory computer-readable media storing instructions executable by the one or more processors, wherein the instructions, when executed, cause the system to perform operations comprising:
      receiving network connection data associated with a plurality of network connections between a plurality of computing devices;
      generating, based at least in part on the network connection data, a graphical database comprising a plurality of graph nodes corresponding to the plurality of computing devices and a plurality of graph edges corresponding to the plurality of network connections;
      performing a database query on the graphical database to generate query results, the database query including a connection pattern to be matched by the query results generated by the performing the database query, wherein the connection pattern comprises connection activity over a period of time and the connection activity over the period of time includes:
         a first connection, initiated by a first computing device associated with a high risk level, with a second computing device; and
         a second connection, initiated by the second computing device subsequent to the first connection and within the period of time, with a third computing device, the second computing device and the third computing device being internal to a service provider network and the first computing device being external to the service provider network; and
      causing at least a portion of the query results to be output to a user.

5. The system of claim 4, wherein:
   the causing at least the portion of the query results to be output to the user comprises:
      rendering a graph view of at least the portion of the query results; and
      outputting the graph view; and
   the database query is received prior to the generating of the graphical database and is associated with an alert to the user triggered by query results being returned by the database query, the alert to the user including the causing at least the portion of the query results to be output to the user when triggered.

6. The system of claim 4, wherein the plurality of graph nodes are labeled as one or more of:
   associated with the user;
   having a low-risk level; or
   having a high risk level.

7. The system of claim 4, further comprising:
   determining the performing the database query returned at least one query result matching the connection pattern; and
   wherein the causing the portion of the query results to be output to the user is performed at least partly in response to the determining the database query returned the at least one query result.

8. A non-transitory computer-readable media storing computer-executable instructions, which when executed by one or more processors, cause the one or more processors to perform actions comprising:
   receiving network connection data associated with a plurality of network connections between a plurality of computing devices;

generating, based at least in part on the network connection data, a graphical database comprising a plurality of graph nodes corresponding to the plurality of computing devices and a plurality of graph edges corresponding to the plurality of network connections;

performing a database query on the graphical database to generate query results, the database query including a connection pattern to be matched by the query results generated by the performing the database query, wherein the connection pattern comprises connection activity over a period of time, and the connection activity over the period of time includes:
  a first connection, initiated by a first computing device with a first Internet Protocol (IP) address associated with a high risk level, with a second computing device, and
  a second connection, initiated by the second computing device subsequent to the first connection and within the period of time, with a third computing device with a second IP address associated with the high risk level; and causing at least a portion of the query results to be output to a user.

9. The non-transitory computer-readable media of claim 8, wherein:
  the causing at least the portion of the query results to be output to the user comprises:
    rendering a graph view of at least the portion of the query results; and
    outputting the graph view.

10. The non-transitory computer-readable media of claim 8, wherein the plurality of graph nodes are labeled as one or more of:
  associated with the user;
  having a low-risk level; or
  having a high risk level.

11. The non-transitory computer-readable media of claim 8, further comprising:
  determining the performing the database query returned at least one query result matching the connection pattern; and
  wherein the causing the portion of the query results to be output to the user is performed at least partly in response to the determining the database query returned the at least one query result.

* * * * *